Dec. 31, 1963 R. W. DE MONTE 3,116,378

NEGATIVE-IMPEDANCE REPEATER

Filed Nov. 21, 1960

INVENTOR
R. W. DE MONTE
BY
Ralph T. Holcomb
ATTORNEY

United States Patent Office 3,116,378
Patented Dec. 31, 1963

3,116,378
NEGATIVE-IMPEDANCE REPEATER

Robert W. DeMonte, Berkeley Heights, N.J., assignor to Bell Telephone Laboratories, Incorporated, New York, N.Y., a corporation of New York Filed Nov. 21, 1960, Ser. No. 70,483
6 Claims. (Cl. 179—170)

This invention relates to telephone repeaters, and more particularly to two-way, negative-impedance repeaters of the shunt type.

An object of the invention is to amplify a signal while providing a match between two different impedances, at least one of which is complex. More specific objects are to provide gain at the office end of a nonloaded transmission line and at the same time improve the impedance match between office and line over the voice range with minimum degradation of signals of lower frequency.

Telephone systems often require a two-way repeater which will provide the desired gain and will also match a complex impedance $Z_1=R_1+jX_1$ (or an admittance $Y_1=G_1-jB_1$) to a complex admittance $Y_2=G_2-jB_2$ over the voice range. It is also necessary to avoid undue interference with the transmission of signals below this range. This need arises, for example, in connection with data transmission, foreign exchange services, off-premise extensions, and connections between private branch exchanges.

The two-way repeater of the present invention is well suited to meet these requirements. The repeater comprises a transformer with three windings, a negative-impedance converter, and an impedance branch. The first and second windings are connected, respectively, to the impedance $Z_1$ and the admittance $Y_2$. The converter is connected to the third winding and terminated in the impedance branch. The branch includes an admittance $Y_3$ the susceptive component $B_3$ of which matches $B_2$ referred to the third winding, and the conductive component $G_3$ of which is less than $G_2$ referred to the third winding. The terminating branch also preferably includes a series inductor and a series resistor to compensate the leakage impedance of the transformer. The reactance $X_1$ may be matched by connecting a properly chosen reactance at the center of the first transformer winding. This may be a capacitor shunted by an inductor.

Figure 1:
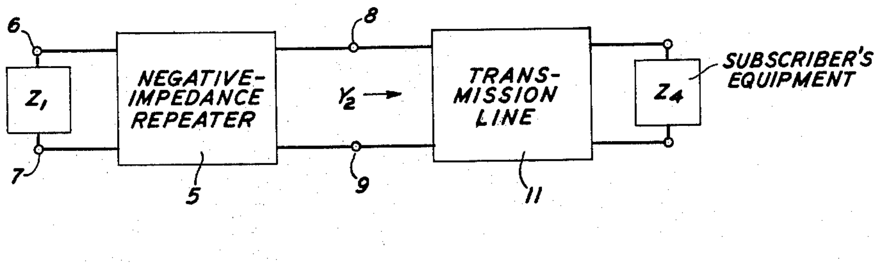
Figure 2:
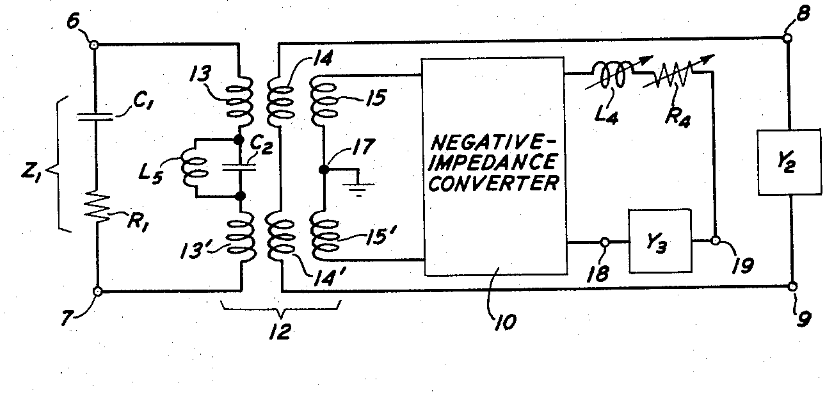
Figure 3:
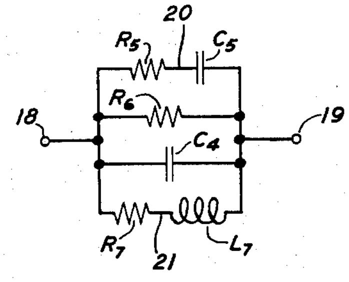

The nature of the invention and its various objects, features, and advantages will appear more fully in the following detailed description of a typical embodiment illustrated in the accompanying drawing, of which FIG. 1 is a block diagram showing a negative-impedance repeater in accordance with the present invention connected between a complex impedance $Z_1$ and a different complex admittance $Y_2$ represented by a transmission line terminated in subscriber's equipment;

FIG. 2 is a schematic circuit showing the repeater of FIG. 1 in more detail; and FIG. 3 is a schematic circuit of an admittance $Y_3$ suitable for use in the termination for the negative-impedance converter in FIG. 2.

In FIG. 1, the negative-impedance repeater 5 is a two-way device with a first terminal pair 6—7 and a second terminal pair 8—9. A complex impedance $Z_1=R_1+jX_1$, which may represent a central office, is connected to the terminals 6—7. A telephone transmission line 11 is connected at one end to the terminals 8—9 and terminated in an impedance $Z_4$. This latter impedance represents subscriber's equipment.

FIG. 2 shows the repeater 5 of FIG. 1 in greater detail. The repeater comprises a transformer 12, a negative-impedance converter 10, and a termination for the converter. The transformer 12 has a two-part primary winding 13—13' between the terminals 6 and 7, a two-part secondary winding 14—14' between the terminals 8 and 9, and a third winding 15—15' inductively coupled to the other two and grounded at its midpoint 17. The impedance $Z_1$, represented by the series combination of a resistor of value $R_1$ and a capacitor of value $C_1$, is connected to the terminals 6—7 and the admittance $Y_2$ to the terminals 8—9. The converter 10, which is assumed to have a conversion ratio of −1, is short-circuit stable at its left port and open-circuit stable at its right port. The left port is connected to the winding 15—15'. The converter 10 terminates at its right port in the series combination of an admittance $Y_3$, an inductor of value $L_4$, and a resistor of value $R_4$. The admittance $Y_3$ has a susceptive component $B_3$ which matches $B_2$ as viewed from the winding 15—15'. Thus, $B_3$ is, in effect, annulled. The conductive component $G_3$ of $Y_3$ must be less than $G_2$, in order to keep the circuit stable. However, with this limitation, the larger $G_3$ is made, the higher the gain of the amplifier will be.

When its value is properly chosen or adjusted, $L_4$ will annul the effect of the leakage inductances associated with the transformer windings. The required value of $L_4$ is the sum of the leakage inductances between the windings 15—15' and 14—14', the windings 15—15' and 13—13', and the windings 14—14' and 13—13', all referred to the winding 15—15'. The value of $R_4$ is chosen or adjusted to annul the effect of the direct-current resistances in the windings. Its value is approximately equal to the direct-current resistance of the winding 15—15' plus the direct-current resistances of the windings 13—13' and 14—14' referred to the winding 15—15'.

With these compensations, the impedance looking into the repeater at the terminals 6—7, with $C_2$ and $L_5$ omitted, is that of a resistance shunted by the inductance of the winding 13—13'. If this inductance is large, the input impedance will be substantially a pure resistance over the frequency range of interest. The turns-ratios of the transformer windings are so chosen that this impedance is substantially equal to the resistive component $R_1$ of $Z_1$.

The reactive component $X_1$ of $Z_1$, due to the capacitance $C_1$, may be balanced by adding a capacitor of value $C_1$ in series with the winding 13—13'. However, in some cases, this is not permissible because the capacitor blocks the transmission of direct-current signals and interferes with the transmission of low-frequency signals. Therefore, $C_1$ is balanced by specially choosing the inductance of the winding 13—13' and by introducing the parallel combination of a capacitor of value $C_2$ and an inductor of value $L_5$ at its center. The inductance of 13—13' should be not less than $R_1^2C_1/3$, and preferably larger. $C_2$ is approximately equal to $C_1/2$. $L_5$ is chosen to resonate with $C_2$ at a frequency above the low-frequency signal range and below the voice range. If, for example, these ranges have limiting frequencies of 90 cycles and 300 cycles, respectively, the resonant frequency may be selected as 150 cycles. The inductor $L_5$ provides the required conductive path. The input impedance at the terminals 6—7 will now have a reactive component closely matching the reactance of $C_1$ over the voice range from 300 cycles to 3,000 cycles or higher.

Assuming that the transmission line 11 is a nonloaded cable and the impedance $Z_4$ is a subscriber's telephone set, $Y_3$ may take the form shown in FIG. 3, comprising four branches connected in parallel between the terminals 18 and 19. The branch 20 includes a resistor $R_5$ and a capacitor $C_5$ in series. The value of $R_5$ must be larger than the direct-current, open-circuit resistance of the cable 11 referred to the winding 15—15' and may, for example, be 25 percent larger. The value of $C_5$ is approximately equal to 0.6 of the distributed capacitance $C_6$ of the cable 11, referred to the winding 15—15′. The branch 20 corrects most of the transmission distortion in the cable 11. The capacitor $C_4$ provides higher frequency correction and is approximately equal to $0.12C_6$. The values of the resistor $R_7$ and the inductor $L_7$ in the branch 21 depend upon the characteristics of the telephone set represented by $Z_4$. Usually, $L_7$ is so large that the branch 21 affects the admittance $Y_3$ only at relatively low frequencies. The value of the resistor $R_6$ determines the flat gain of the repeater 5, which increases as $R_6$ decreases. Any one or more of these elements, $C_4$, $R_6$, $R_7$, and $L_7$, may, under some circumstances, be omitted.

In general, a negative-impedance repeater such as 5 cannot be connected directly in shunt with the line 11 because the repeater has a blocking capacitor which interferes with the transmission of direct-current or low-frequency signals such as dial pulses. This is avoided by coupling the repeater to the line inductively. Since a line such as 11 is usually connected to the office through a transformer, the repeater 5 can be connected in shunt by the addition of only the third winding 15—15′.

Assuming that the windings 13—13′ and 14—14′ constitute an ideal transformer with a turns ratio of 1:n, the gain A of the repeater 5 in decibels is given by the expression $$A=20\log_{10}\frac{n}{2}\left(1+\frac{1}{Y_2Z_1}\right)$$

It is to be understood that the above-described arrangement is only illustrative of the application of the principles of the invention. Numerous other arrangements may be devised by those skilled in the art without departing from the spirit and scope of the invention.

What is claimed is:

1. A negative-impedance repeater for insertion between an impedance $Z_1$ and a complex admittance $Y_2$ comprising a transformer, a negative-impedance converter, and an impedance branch, the transformer having three windings, two of the windings being connected, respectively, to $Z_1$ and $Y_2$, the negative-impedance converter being connected to the third winding and terminated in the branch, the branch including a two-terminal admittance $Y_3$ and an inductor in series therewith, $Y_3$ having a susceptive component $B_3$ approximately equal to the value of the susceptive component $B_2$ of $Y_2$ referred to the third winding and a conductive component $G_3$ less than the conductive component $G_2$ of $Y_2$ referred to the third winding, and the value of the inductor being the sum of the leakage inductances between the third and the second windings, the third and the first windings, and the second and the first windings, all referred to the third winding.

2. A negative-impedance repeater of the shunt type for matching an impedance $Z_1$ to a complex admittance $Y_2$ over a band of frequencies comprising a transformer with two windings connected, respectively, to $Z_1$ and $Y_2$, a third winding inductively coupled to the two windings, a negative-impedance converter connected to the third winding, and an impedance branch terminating the converter, the branch including the series combination of a resistor, an inductor and a capacitor, the resistor and the capacitor having an admittance over the band the susceptive component of which approximately matches the susceptive component of $Y_2$ referred to the third winding and the conductive component of which is less than the conductive component of $Y_2$ referred to the third winding, and the value of the inductor being the sum of the leakage inductances between the third and the second windings, the third and the first windings, and the second and the first windings, all referred to the third winding.

3. A negative-impedance repeater of the shunt type for matching a complex admittance $Y_2$ to the conductive component $G_1$ of a different complex admittance $Y_1$ comprising a transformer with three windings, a negative-impedance converter, an admittance, a resistor, and an inductor, the converter being short-circuit stable at a first port and open-circuit stable at a second port, the first, second, and third of the windings being connected, respectively, to $Y_1$, $Y_2$, and the first port of the converter, the admittance, the resistor, and the inductor being connected in series across the second port of the converter, the admittance having a susceptance approximately equal to the susceptance of $Y_2$ referred to the third winding over a band of frequencies and a conductance less than the conductive component $G_2$ of $Y_2$ referred to the third winding over the band, the resistance of the resistor being approximately equal to the direct-current resistance of the third winding plus the direct-current resistances of the first and second windings referred to the third winding, and the inductance of the inductor being approximately equal to the sum of the leakage inductances between the third and the second windings, the third and the first windings, and the second and the first windings, all referred to the third winding.

4. A two-way, negative-impedance repeater for interconnecting a complex impedance $Z_1$ and a complex admittance $Y_2$ comprising a transformer, a negative-impedance converter with an impedance conversion ratio approximately equal to −1, and a terminating admittance, the transformer having three coupled windings, the first and second of the windings being connected, respectively, to $Z_1$ and $Y_2$, the converter being connected to the third winding and terminated in the terminating admittance, the terminating admittance having a susceptive component approximately equal to the susceptive component of $Y_2$ referred to the third winding, the equivalent circuit of $Z_1$ being the series combination of a resistor of value $R_1$ and a capacitor of value $C_1$, and the first winding having an inductance not less than $R_1^2C_1/3$ and including a capacitor connected in series at its midpoint.

5. A repeater in accordance with claim 4 which includes an inductor connected in shunt with the last-mentioned capacitor.

6. A repeater in accordance with claim 4 in which the last-mentioned capacitor has a value of $C_1/2$.

References Cited in the file of this patent

UNITED STATES PATENTS

| | | |
|---|---|---|
| 2,878,325 | Merrill | Mar. 17, 1959 |
| 2,963,558 | Ceroflini | Dec. 6, 1960 |